(No Model.) 3 Sheets—Sheet 2.
S. MORGAN.
CLIP FOR ROPE HAULAGE.
No. 318,492. Patented May 26, 1885.
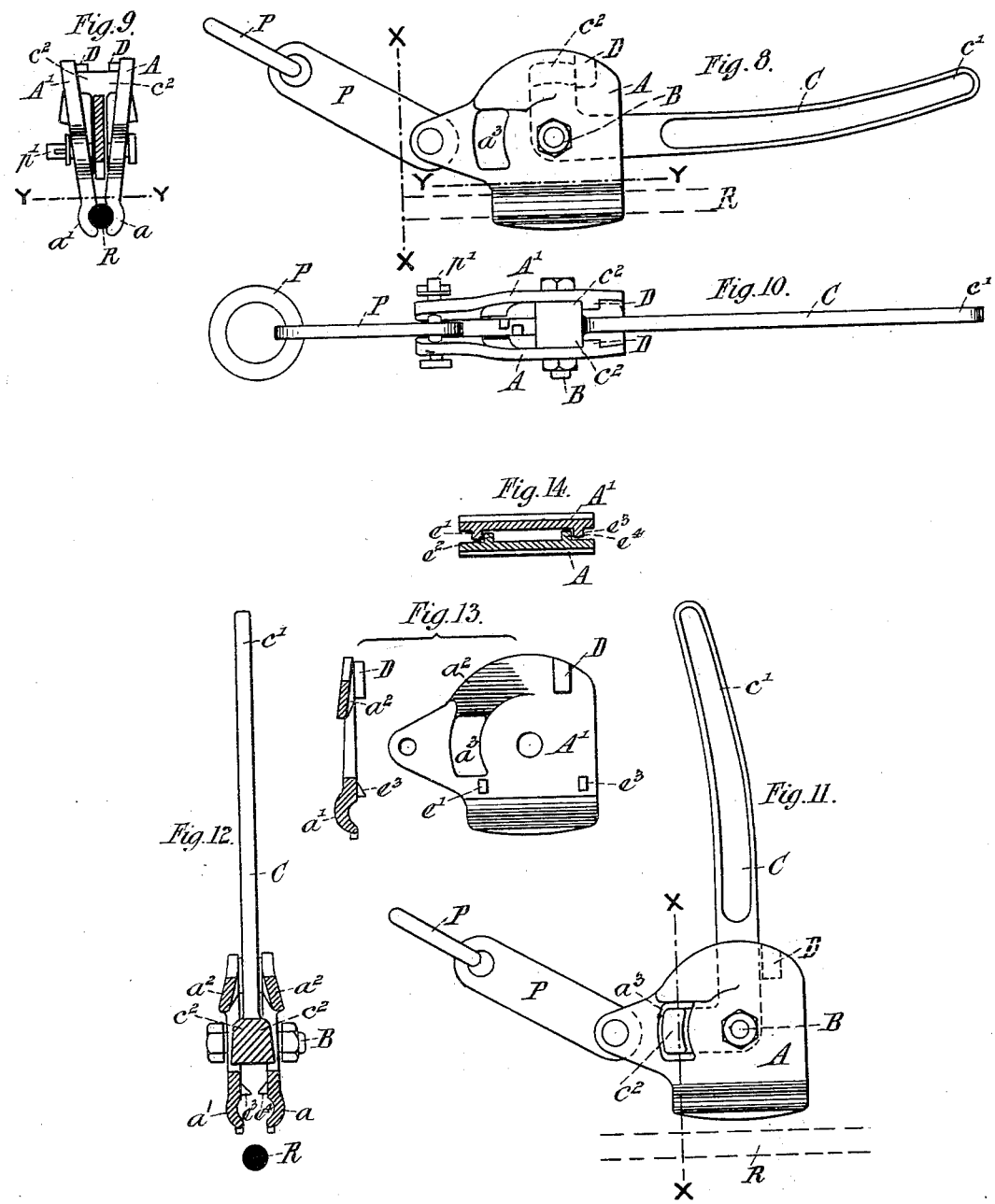
WITNESSES.
Charles Bosworth Kebley
William Charles Batten
INVENTOR.
Samuel Morgan (No Model.) 3 Sheets—Sheet 3.

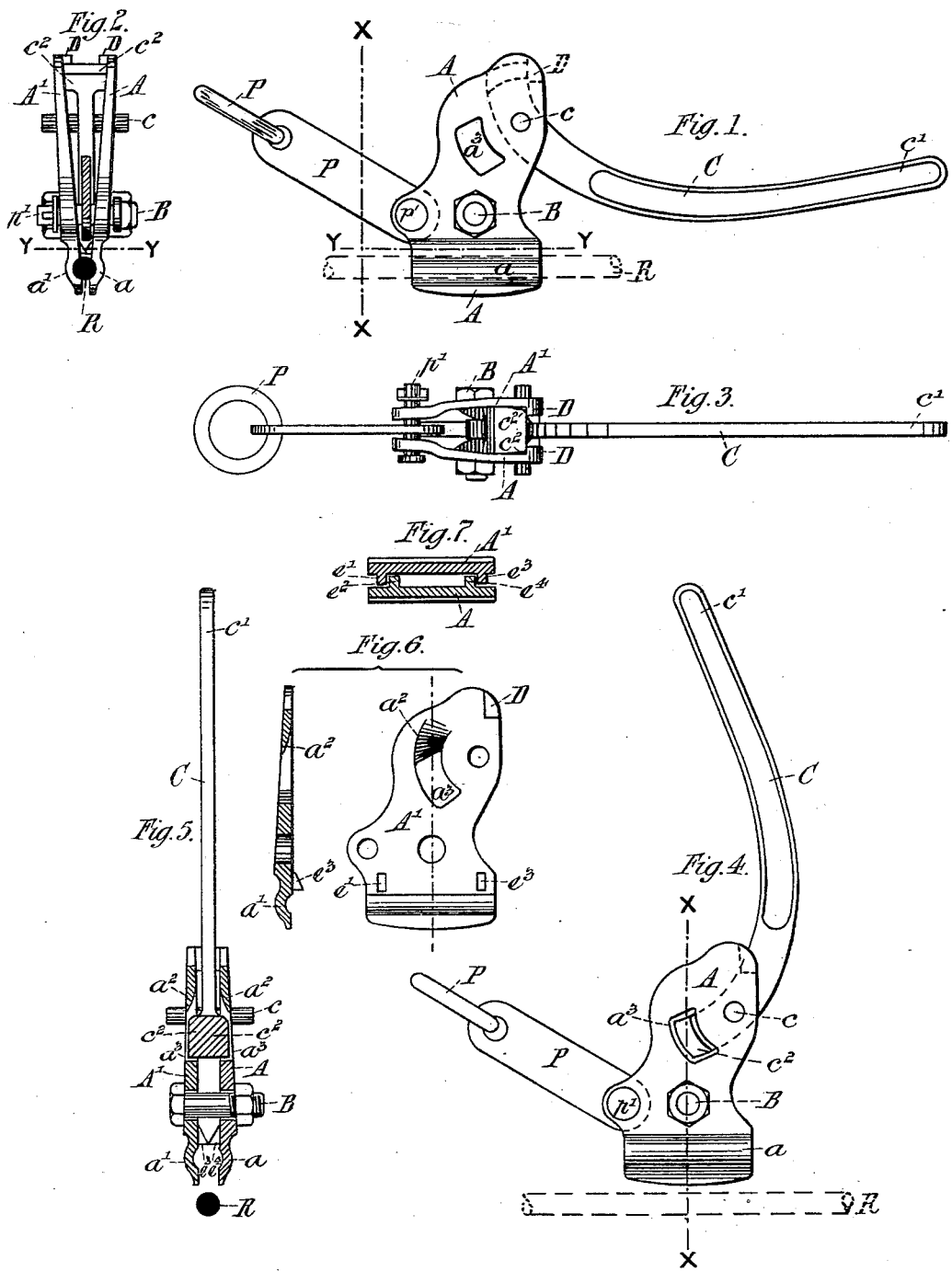

S. MORGAN.
CLIP FOR ROPE HAULAGE.

No. 318,492. Patented May 26, 1885.

WITNESSES.
Charles Bosworth Kebley
William Charles Batten

INVENTOR.
Samuel Morgan

UNITED STATES PATENT OFFICE.

SAMUEL MORGAN, OF BAXTERLEY, NEAR ATHERSTONE, ASSIGNOR TO JAMES MORGAN, OF BENTLEY, COUNTY OF WARWICK, ENGLAND.

CLIP FOR ROPE-HAULAGE.

SPECIFICATION forming part of Letters Patent No. 318,492, dated May 26, 1885.

Application filed March 23, 1885. (No model.)

*To all whom it may concern:*

Be it known that I, SAMUEL MORGAN, a subject of the Queen of Great Britain, residing at Baxterley, near Atherstone, in the county of Warwick, England, have invented certain new and useful Improvements in Clips for Rope-Haulage, of which the following is a specification.

My invention relates to improvements in clips for rope-haulage in which a pair of clipping-plates arranged to be connected to the vehicle or vehicles to be moved are operated by a lever to clip or release a wire or other rope in motion.

The invention consists in a pair of clipping-plates loosely connected and combined with a cam-lever co-operating with inclines upon said plates, to cause said plates to grip or release a rope or cable, substantially as hereinafter particularly set forth.

Figure 15:
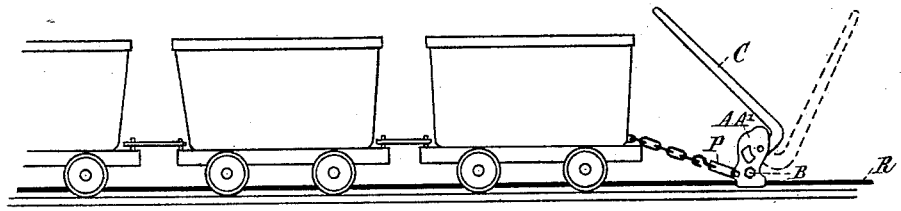
Figure 16:
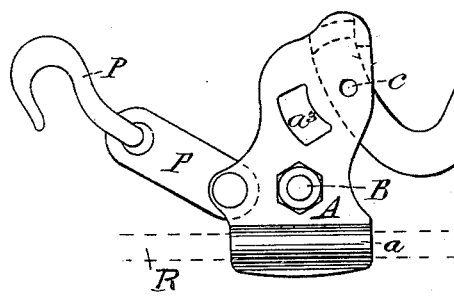
Figure 17:
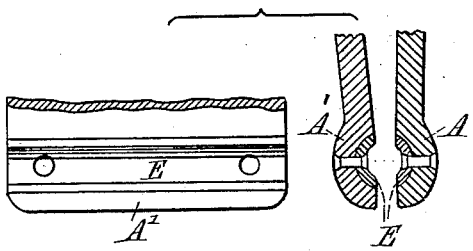

In the accompanying drawings, in the several figures of which like parts are similarly designated, Figure 1 is a side elevation of a clip for rope-haulage constructed in accordance with my invention, and shown connected to a wire or other rope, R. Fig. 2 is a sectional view of the same on line X X of Fig. 1. Fig. 3 is a plan of the same. Fig. 4 is a side elevation of the same clip shown disconnected from the rope. Fig. 5 is a sectional view of the same on line X X of Fig. 4. Fig. 6 shows a side view and section of one of the said clipping-plates, and Fig. 7 is a sectional plan on line Y Y of Figs. 1 and 2. Fig. 8 is a side elevation of a modified form of a clip for rope-haulage constructed in accordance with my invention, and shown connected to a wire or other rope, R. Fig. 9 is a sectional view of the same on line X X of Fig. 8. Fig. 10 is a plan of the same. Fig. 11 is a side elevation of the same clip shown disconnected from the rope. Fig. 12 is a sectional view of the same on line X X of Fig. 11. Fig. 13 shows a side view and section of one of the clipping-plates, and Fig. 14 is a sectional plan on line Y Y of Figs. 8 and 9. Fig. 15 shows the clip illustrated by Figs. 1 to 7, both inclusive, provided with a long and bent lever, so as to be better adapted for a "train-clip." Fig. 16 shows a side elevation of the same, on an enlarged scale, connected to a rope, R; and Fig. 17 shows an inside elevation and cross-section of part of a pair of clipping-plates having removable liners according to my invention.

Similar letters refer to similar parts throughout the several figures.

I will first describe my invention with reference more particularly to Figs. 1 to 7, both inclusive.

A A' are two clipping-plates, of metal, preferably of malleable cast-iron or steel, formed at their bottom parts, $a$ and $a'$, of an approximately semicircular shape, so as to clip the rope R, and being held together by the cross-bolt B, passing through them. A ring or shackle, P, on the cross-pin $p'$ serves to attach the clip to the vehicle to be moved. The said cross-bolt B fits loosely in the plates, and is preferably screw-threaded and provided with a nut, so that by adjusting the nut on the bolt the distance which the said clipping-plates are apart can be adjusted to suit ropes of different sizes and to allow for wear on the jaws.

C is a lever fixed to the fulcrum-pin $c$, passing loosely through the said clipping-plates A and A', as shown. The end $e'$ of the said lever C serves as a handle, and the other end is widened out at each side $c^2$, and formed, preferably, wedge-shaped, to work against corresponding inclined parts, $a^2$ $a^2$, formed on the clipping-plates A A', and so shaped that when the lever C is depressed, as shown in Figs. 1, 2, and 3, the top parts of the clipping-plates will be opened and the bottom parts, $a$ and $a'$, closed to grip the rope R, and when the lever C is elevated, as shown in Figs. 4 and 5, the top parts of the clipping-plates can fall toward each other and the bottom parts, $a$ and $a'$, can open and release the rope. At the bottom of the said inclined parts I prefer to make a hole, $a^3$, in each clipping-plate, so that when the clip is open, as shown in Figs. 4 and 5, the side projecting parts of the lever can fall therein.

The action of my improved haulage-clip as above in part described is as follows: To connect the haulage-clip to a rope, R, the lever C is raised, as shown in Figs. 4 and 5, and the clipping-plates A A' being thereby free to open, they are dropped one on each side of the rope. The stops $e'$ $e^2$ and $e^3$ $e^4$, riveted to or formed with the clipping-plates A and A', respectively, prevent the rope rising up between. The lever C is now depressed and the wedge-shaped parts $c^2$ act on the inclines and force out the top parts of the clipping-plates A A', and so cause the bottom parts, $a\ a'$, to close on to and grip the rope R, so as to be firmly connected thereto. The stops D, formed with the clipping-plates, by coming into contact with the end $c^2$, prevent the lever C being depressed too far, and as the end $c^2$ is then in contact with flat parts of the clipping-plates, they have no tendency to cause the lever to rise and the clip to jar loose. When the lever is raised, the clip will be disconnected, as hereinbefore described, and shown in Figs. 4 and 5. As the lever C is free and not connected directly in any way to the vehicle to be moved, its operations are not interfered with, and it can be as readily disconnected from a heavy train of wagons as from a single empty wagon.

I prefer to carry out my invention as above in part described; but I do not limit myself to the precise details, as various modifications may be made without departing from its nature—for instance, as shown by Figs. 8 to 14, both inclusive, where the lever C, instead of being provided with an independent fulcrum-pin, $c$, is centered on the cross-bolt B. Its operation is similar to that of the clip hereinbefore described with reference to Figs. 1 to 7, both inclusive, as will be readily understood.

Clips constructed according to my invention can be used either for single wagons or trains; but those illustrated by Figs. 1 to 7 and 8 to 14 are more applicable for the former. When used for trains, I prefer to provide a longer lever and to bend it upward, as shown in Figs. 15 and 16, so as to be readily operated by an attendant in the first tub.

In order that the jaws of the clipping-plates may be readily renewed when worn, I rivet loose pieces E thereto, as shown in Fig. 17, which can be readily removed and replaced by new ones.

What I claim as my invention, and desire to secure by Letters Patent, is—

1. In a clip for rope-haulage, the combination of the lever C, having projecting parts $c^2$, with a pair of clipping-plates provided with suitable inclined parts, $a^2$, and connected together by a cross-bolt, B, all substantially as described, and for the purposes set forth.

2. The pair of loosely-connected gripping-plates provided with inclined parts $a^2$, combined with a lever, C, having projecting matching parts $c^2$ and pivoted between said plates, substantially as described.

3. The pair of gripping-plates A A', having gripping-surfaces $a\ a'$ and inclined parts $a^2\ a^2$, the adjustable connecting-bolt B for said plates, and the lever C, pivoted between said plates and having projecting inclines $c^2\ c^2$, matching the inclined parts of the plates, substantially as described.

4. The pair of loosely-connected gripping-plates provided with inclined parts $a^2$ and openings $a^3$, combined with a lever, C, having projecting matching parts $c^2$ and pivoted between said plates, substantially as described.

5. The pair of loosely-connected gripping-plates provided with inclined parts $a^2$, combined with a lever, C, having projecting matching parts $c^2$ and pivoted between said plates, and stops $e'\ e^2\ e^3\ e^4$, substantially as described.

In testimony whereof I have signed in the presence of two subscribing witnesses.

SAMUEL MORGAN.

Witnesses:
CHARLES BOSWORTH KETLEY,
WILLIAM CHARLES BATTEN.